United States Patent
Kumar et al.

(10) Patent No.: US 12,155,886 B2
(45) Date of Patent: Nov. 26, 2024

(54) EFFICIENT MEDIA STREAM ENCRYPTION PROVIDING FULL CONTENT PROTECTION

(71) Applicant: DISH Network Technologies India Private Limited, Bengaluru (IN)

(72) Inventors: Amit Kumar, Whitefield (IN); Ankit Gandhi, Karnataka (IN); Himanshu Jain, Karnataka (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 197 days.

(21) Appl. No.: 17/710,384

(22) Filed: Mar. 31, 2022

(65) Prior Publication Data

US 2023/0252110 A1    Aug. 10, 2023

(30) Foreign Application Priority Data

Feb. 10, 2022    (IN) .............................. 202241007139

(51) Int. Cl.
*H04N 21/426*    (2011.01)
*G06F 21/10*    (2013.01)
*G06F 21/60*    (2013.01)
*H04N 21/4408*    (2011.01)

(52) U.S. Cl.
CPC ....... *H04N 21/4263* (2013.01); *G06F 21/602* (2013.01); *H04N 21/4408* (2013.01); *G06F 21/1062* (2023.08)

(58) Field of Classification Search
CPC ........... H04N 21/4263; H04N 21/4408; H04N 21/23476; H04N 21/44055; H04N 21/8456; G06F 21/602; G06F 21/1062; G06F 21/10
See application file for complete search history.

(56) References Cited

U.S. PATENT DOCUMENTS

| | | | | |
|---|---|---|---|---|
| 10,298,387 | B1* | 5/2019 | Good | H04L 63/0464 |
| 11,531,767 | B1* | 12/2022 | Szanto | G06F 21/6209 |
| 2009/0157750 | A1* | 6/2009 | Kim | G11B 27/3027 |
| | | | | 713/168 |
| 2013/0232339 | A1* | 9/2013 | Ignatchenko | H04N 21/2347 |
| | | | | 713/171 |
| 2016/0234682 | A1* | 8/2016 | Mandyam | H04W 12/06 |
| 2023/0030403 | A1* | 2/2023 | Jeuk | H04N 21/2347 |

* cited by examiner

*Primary Examiner* — Abiy Getachew
(74) *Attorney, Agent, or Firm* — Kilpatrick Townsend & Stockton LLP

(57) ABSTRACT

Various systems, methods and devices are presented for performing media encryption. A media stream comprising audio packets and video packets can be received. A chunk of the media stream can be sorted to create a first group of a plurality of audio packets with an I-frame header and a second group of a plurality of P-frames and an I-frame payload. The first group can be encrypted while the second group is not encrypted. A fully-protected output media stream that includes the encrypted first group and the second group can then be streamed to a remote device via a network for output.

19 Claims, 4 Drawing Sheets

EFFICIENT MEDIA STREAM ENCRYPTION PROVIDING FULL CONTENT PROTECTION

CROSS-REFERENCE TO RELATED APPLICATIONS

This application claims priority to Indian Patent Application No. 202241007139, filed on Feb. 10, 2022, entitled "Efficient Media Stream Encryption Providing Full Content Protection," the disclosure of which is hereby incorporated by reference in its entirety for all purposes.

BACKGROUND

Encryption can be a processing-intensive task. For example, consumer devices that are required to perform encryption may need to devote a substantial amount of processing resources to the task. In some situations, media needs to be encrypted. The amount of processing resources that need to be devoted to encryption increases significantly if multiple media streams are being processed concurrently. Efficient encryption processes can help alleviate the amount of processing resources that need to be devoted to encryption.

SUMMARY

In some embodiments, a media encryption system is presented. The system can include a media input interface, wherein the media input interface is configured to receive an audio stream and a video stream. The system can include a packet sorter configured to group audio packets from the audio stream with an I-frame from the video stream. The system can include an encryption engine configured to encrypt the grouped audio packets and a header from the I-frame to create an encrypted media chunk. The system can include a media output interface, configured to output an output media stream, comprising: the encrypted media chunk and an unencrypted media chunk, wherein the unencrypted media chunk comprises at least one P-Frame.

Embodiments of such a system can include one or more of the following features: The encryption engine is configured to encrypt only audio packets and I-Frame headers. The system can include a plurality of over-the-air (OTA) tuners, wherein the media input interface receives the audio stream and the video stream from an OTA tuner of the plurality of OTA tuners. The system can include a wireless network interface configured to receive the output media stream from the media output interface and transmit the output media stream via a wireless local area network to a media playback device. The system can include an over-the-air antenna configured to be connected with the plurality of OTA tuners. The system can include the media playback device configured to receive the output media stream via the wireless local area network, and decrypt the encrypted media chunk. The encrypted media chunk can be a single encrypted packet and the unencrypted media chunk is a single unencrypted packet. The unencrypted media chunk comprises contents of the I-frame except the header. The media encryption system can be configured to output at least four different output media streams concurrently. Less than 7% of the output media stream may be encrypted. A device housing may be present that houses the media input interface, the packet sorter, the encryption engine, and the media output interface.

In some embodiments, a method for performing media encryption is presented. The method can include receiving, by a media encryption system, a media stream comprising audio packets and video packets. The method can include sorting, by the media encryption system, a chunk of the media stream to create a first group of a plurality of audio packets with an I-frame header and a second group of a plurality of P-frames and an I-frame payload. The method can include encrypting, by the media encryption system, the first group. The method can include outputting, by the media encryption system, an output media stream comprising the encrypted first group and the second group, wherein the output media stream is output to a media playback device for presentation.

Embodiments of such a method can include one or more of the following features: Encryption may be performed only audio packets and I-Frame headers. The method can include receiving, by an over-the-air (OTA) content receiver, the media stream from an OTA digital antenna, wherein the media stream is a digital broadcast television channel. The method can include transmitting, by the OTA content receiver, the first group and second group via a wireless communication protocol to the media playback device. The method can include receiving, by the media playback device, the encrypted first group and the second group. The method can include decrypting, by the media playback device, the encrypted first group. The method can include decoding, by the media playback device, the decrypted first group and the second group. The method can include outputting, by the media playback device, the decrypted first group and the second group for presentation. The method can include combining, by the media encryption system, the plurality of audio packets. The media encryption system can process at least four different media streams, including the media stream, concurrently. Less than 7% of the output media stream may be encrypted. The method can include inserting, by the media encryption system, null packets that indicate whether subsequent packets are encrypted or unencrypted. The media stream may be encoded according to MPEG-2.

DETAILED DESCRIPTION

Figure 1:
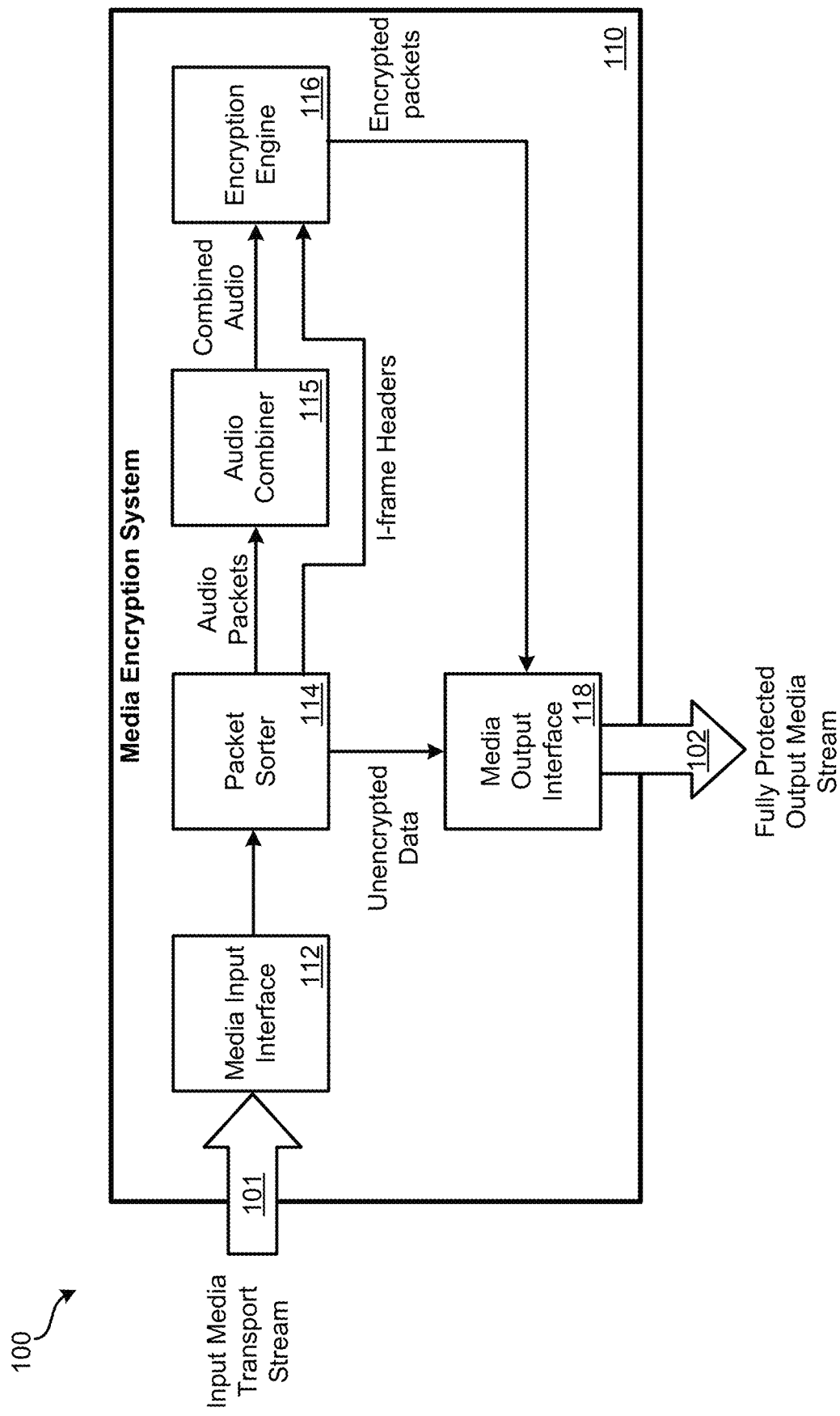
FIG. 1 illustrates an embodiment of a media encryption system.

Embodiments detailed herein are focused on an efficient encryption process. The benefits of such an efficient encryption process may be particularly beneficial when encryption needs to be performed by a consumer device. For example, a media streaming device that can be operated by an end user may need to perform encryption of one or more media stream concurrently. To decrease the amount of processing required to be performed and, thus, decrease the complexity of the processing system needed, such an efficient encryption process as detailed herein can be used.

As detailed herein, encryption of a media stream can be efficiently achieved without all data needing to be encrypted. Rather, key parts of data can be encrypted that serve to effectively encrypt the whole. In MPEG video encoding (e.g., MPEG-2), video frames are divided up into I-Frames (intra-coded frames) P-frames (progressive code frames), and, possibly, B-frames (bidirectional predicted frames). An I-Frame is a complete image. Therefore, using only the information included in the I-Frame itself, a complete image can be constructed. This is not true for P- and B-frames. Rather, P-frames require information from a previous frame to construct the frame. B-frames can require information from the previous frame, the next frame, or both.

In order to construct a video frame for output from a P-frame or a B-frame, data from an I-frame is needed as a starting point. Therefore, if an I-frame is partially or fully encrypted, the corresponding P- and B-frames that rely on the I-frame cannot be reconstructed without first decrypting the I-frame. In embodiments detailed herein, this reliance on I-frames is used to performed efficient encryption.

In embodiments detailed herein, packets to be encrypted are grouped together by type. In some embodiments, audio data for a given time period (e.g., one second) is grouped, combined, and encrypted along with a header from an I-frame. The remainder of the I-frame, along with P-frames, B-frames, or both are not encrypted and can be transmitted as a separate one or more packets. Such an arrangement can decrease the amount of encryption that needs to be performed while providing full content protection since none of the audio or video content can be reconstructed without first decrypting at least some of the encrypted data. Such an arrangement can decrease the amount of encryption by more than 90% compared with arrangements in which all video and audio is encrypted.

Such an arrangement may be particularly useful in consumer electronics that have limited processing power. For example, an OTA streaming device may receive OTA broadcast television in an unencrypted form. This broadcast television may be received in the form of MPEG packets using a digital OTA antenna. The packets and their data may be reordered to a first group to be encrypted that includes the audio and I-frame headers and a second group that is to be retransmitted without encryption, which can include the I-frames other than the headers, P-frames, and B-frames. The encrypted and unencrypted groups may be retransmitted, such as via a home wireless local area network to one or more media output devices (e.g., a television, a media stream device, a tablet computer) located within the home and directly connected with the wireless LAN or located outside of the home and connected with the wireless LAN via the Internet.

Further detail regarding such embodiments and other embodiments is provided in relation to the figures. FIG. 1 illustrates an embodiment 100 of a media encryption system 110 ("system 110"). System 110 include: media input interface 112; packet sorter 114; audio combiner 115; encryption engine 116; and media output interface 118. System 110 can be implemented using a processing system that includes one or more processors. More specifically, system 110 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Further, in some embodiments, the functions of the components of media encryption system 110 can be implemented using a cloud-computing platform, which is operated by a separate cloud-service provider that executes code and provides storage for clients.

System 110 generally receives input media transport stream 101 and outputs fully protected output media stream 102. Input media transport stream 101 represents an MPEG (Moving Picture Experts Group) standard (e.g., MPEG-2) for encoding that provides compression of video and audio. Input media transport stream 101 includes both video and audio packets in unencrypted form. In other embodiments, only video packets may be present. In some embodiments, input media transport stream 101 is obtained from a source in unencrypted form, such as an over-the-air (OTA) broadcast of a digital television channel. In other embodiments, input media transport stream 101 may first need to be unencrypted before being processed by media encryption system 110.

Media input interface 112 can serve to receive input media transport stream 101 and divide the received media transport stream into defined chunks, which can correspond to a period of time, such as one second chunks. Such a chunk size may be selected based on a known frequency of I-frames. For instance, if input media TS is known to have an I-frame once per second, using a chunk size of one second may ensure that each chunk includes data for a single I-frame. Input media stream may contain at least MPEG I-frame packets and P-frame packets. In some embodiments, audio packets are present. In some embodiments, B-frame packets can also be present. The packets of different types of frames and audio may be received by media input interface 112 in an interleaved or mixed order. The chunks created are passed to packet sorter 114.

Packet sorter 114 may serve to perform packet sorting into two groups: a first group to be encrypted and a second group that is to remain unencrypted. In addition to grouping packets, packet sorter 114 may also bifurcate I-frames into two portions. A first portion may be created that includes only the I-frame header. A second portion may be created includes only the payload of the I-frame, which corresponds to the pixel values of the image. The first group can be grouped to include: the I-frame header; and the audio packets. These may be the only types of packets/data included in the first group. The second group can include: the I-frame payload and P- and B-frames. The first group of packets is passed to encryption engine 116, while the second group of packets is passed directly to media output interface 118. In some embodiments, packet sorter 114 also sorts packets into a particular order. For example, for the first group, audio data can be grouped together and placed immediately before an I-frame header.

The audio packets that have been grouped together by packet sorter 114 may be passed to audio combiner 115. Audio combiner 115 can serve to combine the audio packets together for the given time period, such as one second. As such, one large audio packet may be created that includes all of the audio for the time period. By combining these audio packets together, the amount of data devoted to overhead, such as packet headers, for the audio is decreased and, thus, decreases the amount of data that needs to be encrypted. The combined audio data may be then passed to encryption engine 116.

Notably, in order to decode an I-frame, the I-frame header must be present. Therefore, if the I-frame header is encrypted or not present, the data from the I-frame is effectively not accessible. Further, since a complete I-frame is needed to construct P- and B-frames, without an I-frame header, related P- and B-frames are also effectively not accessible. Therefore, if I-frame headers are encrypted, video created based on I-, P-, and B-frames are protected by the encryption.

Encryption engine 116 can serve to encrypt data from the first group including the combined audio and the I-frame header. Various known forms of encryption may be used, such as MPEG Common Encryption (MPEG-CENC). Encrypted data can then be packetized by media output interface 118. A packet including encrypted data can be created by media output interface 118 that includes the audio data and the I-Frame header. This packet may include data indicative of the encryption type to enable the receiving device to properly decrypt it. Media output interface 118 may also create a packet for the second group of data that includes the unencrypted data. The data included in this packet can include a size definition.

Media output interface 118 then outputs packets that include encrypted data and packets that include unencrypted data. However, the output can be understood to be fully protected by virtue of: 1) all audio being encrypted; and 2) I-frame headers being encrypted. As previously noted, by virtue of I-frame headers being encrypted, the remainder of the I-frame nor P-/B-frames are decodable without first decrypting the I-frame header.

In some embodiments, null packets are also inserted by media output interface 118. These packets do not include any video or audio data, but rather indicate whether a next group of data of an indicated byte size include encrypted (and type of encryption) or non-encrypted data.

As an example of how media encryption system 110 may be used, a one second chunk duration may be set. The audio encoding rate defines how much audio data will be present in the one second chunk. For example, 128 kbps (kilobits per second) corresponds to 16 kilobytes for a 1 second chunk. An I-frame header can also be 16 kilobytes or smaller in size. Therefore, each encrypted packet that is constructed includes one second of audio, one I-frame header, and has a size of 32 kilobytes or less. Other data may be included in the packet, such as information about the encryption type and a packet identifier. This encrypted packet can then be sent to a media output device for playback.

For data from the one second chunk that is not to be encrypted, the sorted P-frames, B-frames, and payload of the I-frame may have a size determination made and an unencrypted packet constructed that indicates the size of the packet. This unencrypted packet can then be sent to the media output device to be used for playback.

Using the single encrypted packet and the single unencrypted packet, the media output device may receive the data necessary to decrypt and decode the one second of video and audio corresponding to the one second chunk. In some situations, one or more frames from an earlier or later chunk may be needed to decode P- and/or B-frames. In other embodiments, chunking is performed such that the included P-frames refer only to the I-frame that is part of the same chunk.

In an embodiment where input media transport stream 101 is a 4 megabit per second transport stream with 128 kbps audio stream, only 32 kilobytes per second is encrypted and, thus, only 6.25% of the input media TS is encrypted within fully protected output media stream 102. In an embodiment where input media transport stream 101 is a 4 megabit per second transport stream with a 64 kbps audio stream, only 16 kilobytes per second is encrypted and, thus, only 3.125% of the input media TS is encrypted within fully protected output media stream 102. Therefore, at minimum, all content within input media transport stream 101 can be protected by encrypting less than 6.5% of input media transport stream 101.

Figure 2:
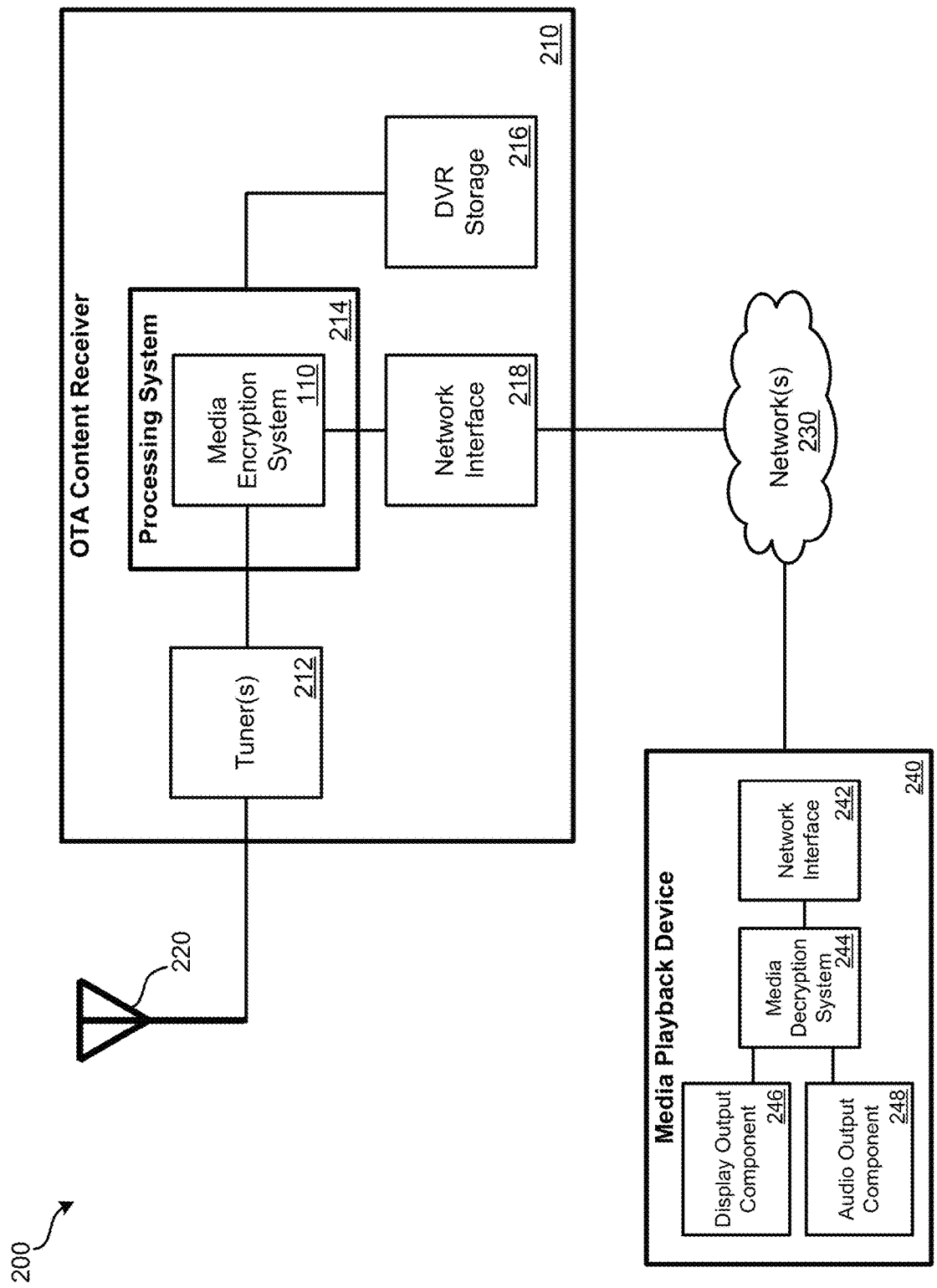
FIG. 2 illustrates an embodiment of an over-the-air (OTA) media distribution system.

System 110 can be used within a larger system, such as an over-the-air (OTA) media streaming system 200. FIG. 2 illustrates an embodiment of an over-the-air (OTA) media distribution system. OTA media streaming system 200 can include: OTA content receiver 210; OTA antenna 220; one or more networks 230; and media playback device 240. At a high level, OTA media streaming system 200 can be used to capture OTA television broadcasts, such as those transmitted on VHF and UHF bands that are free to access by the public. OTA media streaming system 200 can allow such OTA broadcasts to be received via OTA antenna 220 and streamed to a remote media playback device that may be present within a user's home or may be in communication with OTA content receiver 210 via the Internet. For example, such an arrangement can allow a consumer to view broadcast OTA television channels received at his home wherever the consumer happens to be as long as he has Internet access.

OTA content receiver 210 can be a single device contained in a housing with one or more exposed ports, of which a port may be electrically connected with OTA antenna 220. Such a connection may be made via coaxial cable or some other form of electrical connection. OTA antenna 220 may be an antenna designed to receive digital broadcast OTA television signals, which may include high definition (HD) video content. OTA antenna 220 may be an indoor or outdoor antenna.

OTA content receiver 210 includes various components, including: one or more tuners 212; processing system 214; digital video recorder (DVR) storage 216; and network interface 218. Tuners 212 can allow various frequencies to be tuned to for reception via OTA antenna 220. For each television channel, a separate tuner may need to be used since each television channel is broadcast on a different frequency. For example, if tuners 212 includes four tuners, four television channels that are broadcast on different frequencies can be received over a same time period. Embodiments of OTA content receiver 210 can include one, two, three, four, or some greater number of tuners. When multiple tuners are being used to receive different television channels, the processing load of encryption can increase by a corresponding multiple. For example, if four tuners are used to receive four different television channels at the same time, the processing load to perform encryption can be four times greater than if a single channel is being encoded.

Processing system 214 may execute media encryption system 110 as detailed in relation to FIG. 1. DVR storage 216, which is implemented on one or more non-transitory processor-readable mediums, may be used to record and store content for later output to a media playback device. A user can schedule recording of content such that the content is available for later viewing. In some embodiments, such recorded content is recorded to DVR storage 216 as encrypted by media encryption system 110. In other embodiments, recorded content is stored in an unencrypted form, but is encrypted when playback is requested and the media is to be transmitted to media playback device 240.

Network interface 218 can allow media, including received OTA television channels, to be streamed over a wired or wireless network. Network interface 218 may use an IEEE 802.11 family protocol (e.g., Wi-Fi®) to transmit media via networks 230. In other embodiments, a direct wired or wireless connection can be present with media playback device 240. For example, OTA content receiver 210 may be a dongle that is connected directly with media playback device 240.

Networks 230 can include a home wireless (or wired) network. If media playback device 240 is located within a user's home, media content may be streamed via the home wireless network directly to media playback device 240. If media playback device 240 is outside the range the home wireless network but has Internet access, networks 230 can include the Internet and, possibly, one or more additional wired or wireless networks that are used to route communications between media playback device 240 and OTA content receiver 210.

Media playback device 240 may be any form of media output device that a user desires to use to directly or indirectly view and listen to content. Media playback device 240 may be a smart television, a tablet computer, a desktop computer, a smartphone, a gaming device (e.g., Nintendo Switch), laptop computer, home assistant device, etc. Media playback device 240 may also be a media streaming device that can be connected with a port of a television (e.g., a non-smart television that would otherwise not be able to receive streaming content).

Media playback device 240 can include components to directly and/or indirectly output video and audio. Display output component 246 can be a display screen or an output port to transmit video to another device for presentation. Audio output component 248 may be one or more speakers, a headphone jack, a wireless interface to transmit audio to wireless headphones or some other form of wireless audio output device, or some other form of port that outputs a signal that causes the audio to be output via another device. In some embodiments, display output component 246 and audio output component 248 are combined into a single interface, such as an HDMI (High Definition Multimedia Interface) interface to output video and audio to another device.

Media playback device 240 does not need to have special-purpose software or hardware to handle the encryption performed by media encryption system 110. Rather, as long as media playback device 240 has software and/or hardware that can handle the standard type of encryption employed by media encryption system 110, decryption can be performed. Network interface 242 receives the encrypted and unencrypted packets transmitted by network interface 218. Media decryption system 244 performs the decryption on the encrypted packets. The content is then reassembled and decoded from the decrypted I-frame headers, the decrypted audio, and the unencrypted I-frame payloads, P-frames and/or B-frames. The decoded content is then output via display output component 246 and audio output component 248.

While the encryption arrangements detailed herein can be used for encryption of OTA television channel media streams, the encryption arrangements detailed herein can also be applied to other situations in which an efficient encoding of MPEG video and, possibly, audio would be useful, including transmission over the Internet or some other form of network.

Figure 3:
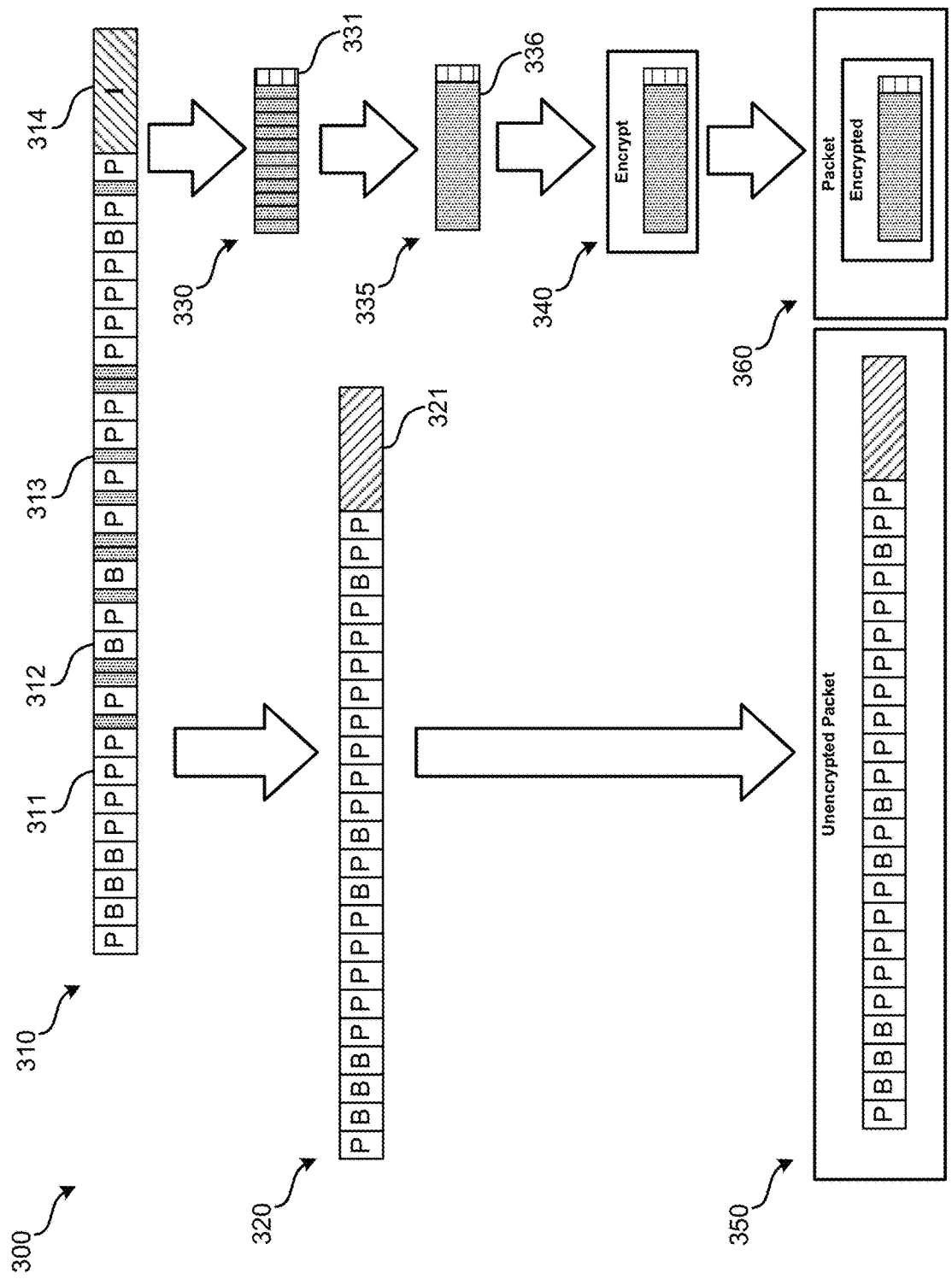
FIG. 3 illustrates a graphical representation of packet reordering and encryption.

The encryption processes detailed herein can be represented visually. FIG. 3 illustrates a graphical representation 300 of packet reordering and encryption of a media transport stream. Media transport stream 310 can be received from various sources, such as an OTA broadcast of a television channel. In other embodiments, media transport stream 310 can be received via the Internet or some other source. Media transport stream includes various video frames, such as I-frame 314, P-frame 311, B-frame 312, and audio packet 313. The sizes of each packet and relative numbers of each type of packet are not to scale or intended to be representative of an actual media transport stream, but rather are only used for illustration.

In the example of graphical representation 300, a time period during which a single I-frame is transmitted is shown. In a real-world implementation, the MPEG encoding may be set to create an I-frame once per second. The encryption process may be configured based on the MPEG encoding to encrypt in one second chunks such that each chunk includes a single I-frame.

Packets that are to remain unencrypted, including P-frames, B-frames, and the payload of I-frames may be filtered out into group 320. Group 320 includes I-frame payload 321. Packets that are to be encrypted, including audio frames and the I-frame header are filtered into group 330, which illustrates the I-frame header as I-frame header 331.

The audio packets are combined together to decrease overhead, illustrated as combined audio packet 336 in group 335. The combined audio packet and I-frame header 331 are then encrypted to create encrypted data 340. Packets are constructed using either exclusively encrypted or exclusively unencrypted data. Packet 360 is constructed using the encrypted data from group 335 along with header data such as the packet size and an indication of the type of encryption. Packet 350 is constructed using the unencrypted data from group 320 along with header data, such as the packet size. In other embodiments, a greater number of unencrypted and/or encrypted packets may be created for each time period. For example, group 320 may be broken up into two or more packets.

Figure 4:
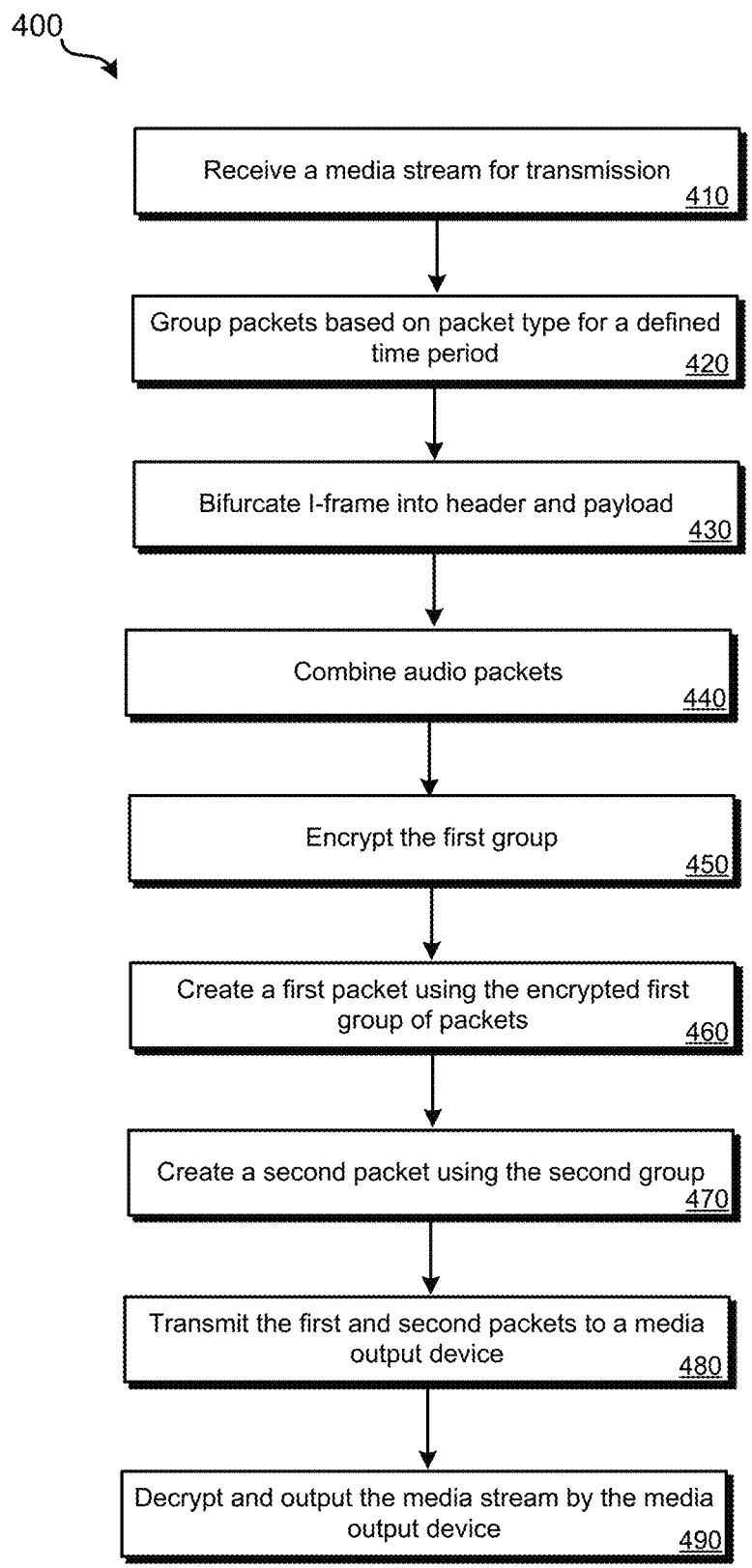
FIG. 4 illustrates an embodiment of a method for performing media encryption.

Various methods may be performed using the devices, systems, and arrangements detailed in relation to FIGS. 1-3. FIG. 4 illustrates an embodiment of a method 400 for performing media encryption. Method 400 can be performed using one or more processors that are configured to execute instructions stored on a processor-readable medium. Alternatively, special-purpose processing hardware may be configured to perform the steps of method 400. Embodiments of method 400 can be performed by system 110 of FIG. 1, which may be part of OTA media streaming system 200 of FIG. 2.

At block 410, a media transport stream can be received or otherwise obtained, such as from storage, that is to be transmitted to a remote device for output. The media transport stream includes MPEG video and can also include audio. A possible source of the media stream is an OTA digital television channel broadcast.

At block 420, for a defined time period, such as one second chunks, packets may be cached from the media transport stream and sorted based on the packet type. The defined time period may be set such that a single I-frame is expected to be received during the time period. A first group of packets may be created that includes audio packets and a second group of packets may be created that included P-frames, B-frames, or both. At block 430, for an I-frame received within the defined time period, the I-frame is bifurcated into the I-frame header and the remainder of the I-frame, referred to as the payload. The I-frame header is added to the first group and the payload is added to the second group.

At block 440, audio packets can be combined to reduce the number of audio packets. For instance, all audio packets for the chunk may be combined into a single, larger audio packet or data grouping.

At block 450, the first group of packets, which can include the combined audio from block 440 and the I-frame header from block 430 is encrypted together.

At block 460, this encrypted group of data is packaged into a packet which includes a header indicative of the packet and type of encryption. At block 470, a second packet is created based on the second group that is to remain unencrypted. The second packet remains unencrypted and includes a header indicative of the packet size. In other embodiments, more than two packets for the chunk are created.

At block 475, in some embodiments, null packets are created. These packets do not include any video or audio data, but rather serve as an indicator as to a next group of data of an indicated byte size include encrypted (and type of encryption) or non-encrypted data. This arrangement can be more efficient to handle by the media output device. For example, rather than having each encrypted packet sent include an indicator of encryption and/or the type of encryption, a single null packet can be sent that indicates as such for an amount of data being sent. This arrangement can decrease the total amount of data devoted to overhead. Such a null packet arrangement can also be used for unencrypted data.

At block 480, the first and second packets are output, such as by being transmitted via a home wireless network, to a media output device for presentation. If the null packet arrangement of block 475 is used, null packets that identify whether the next packets are encrypted or unencrypted can be interspersed between the one or more first packets and one or more second packets. At block 490, the media output device, receives, decrypts as needed, decodes, and outputs the media stream for playback.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A media encryption system, comprising:
   a media input interface, wherein the media input interface is configured to receive an audio stream and a video stream;
   a packet sorter that:
      bifurcates an I-frame into an I-frame header and an I-frame payload;
      groups audio packets from the audio stream and the I-frame header, without the I-frame payload; and
      groups at least one P-Frame and the I-frame payload, without the I-frame header, to create an unencrypted media chunk;
   an encryption engine that encrypts the grouped audio packets and a the I-frame header to create an encrypted media chunk; and
   a media output interface that outputs an output media stream, comprising: the encrypted media chunk and the unencrypted media chunk.

2. The media encryption system of claim 1, wherein the encryption engine is configured to encrypt only audio packets and I-Frame headers.

3. The media encryption system of claim 1, further comprising a plurality of over-the-air (OTA) tuners, wherein the media input interface receives the audio stream and the video stream from an OTA tuner of the plurality of OTA tuners.

4. The media encryption system of claim 3, a wireless network interface configured to receive the output media stream from the media output interface and transmit the output media stream via a wireless local area network to a media playback device.

5. The media encryption system of claim 4, further comprising:
   an over-the-air antenna configured to be connected with the plurality of OTA tuners; and
   the media playback device configured to receive the output media stream via the wireless local area network, and decrypt the encrypted media chunk.

6. The media encryption system of claim 1, wherein the encrypted media chunk is a single encrypted packet and the unencrypted media chunk is a single unencrypted packet.

7. The media encryption system of claim 4, wherein the media encryption system is configured to output at least four different output media streams concurrently.

8. The media encryption system of claim 1, wherein less than 7% of the output media stream is encrypted.

9. The media encryption system of claim 1, comprising a device housing that houses the media input interface, the packet sorter, the encryption engine, and the media output interface.

10. A method for performing media encryption, the method comprising:
- receiving, by a media encryption system, a media stream comprising audio packets and video packets;
- sorting, by the media encryption system, a chunk of the media stream to create a first group of a plurality of audio packets with an I-frame header and a second group of a plurality of P-frames and an I-frame payload, wherein the second group is unencrypted;
- encrypting, by the media encryption system, the first group such that the I-frame header and the audio packets are encrypted but the I-Frame payload is not encrypted; and
- outputting, by the media encryption system, an output media stream comprising the encrypted first group and the second group, wherein the output media stream is output to a media playback device for presentation.

11. The method for performing media encryption of claim 10, wherein encryption is performed only audio packets and I-Frame headers.

12. The method for performing media encryption of claim 10, further comprising:
- receiving, by an over-the-air (OTA) content receiver, the media stream from an OTA digital antenna, wherein the media stream is a digital broadcast television channel.

13. The method for performing media encryption of claim 12, further comprising:
- transmitting, by the OTA content receiver, the first group and the second group via a wireless communication protocol to the media playback device.

14. The method for performing media encryption of claim 13, further comprising:
- receiving, by the media playback device, the encrypted first group and the second group;
- decrypting, by the media playback device, the encrypted first group;
- decoding, by the media playback device, the decrypted first group and the second group; and
- outputting, by the media playback device, the decrypted first group and the second group for presentation.

15. The method for performing media encryption of claim 10, further comprising:
- combining, by the media encryption system, the plurality of audio packets.

16. The method for performing media encryption of claim 13, wherein the media encryption system processes at least four different media streams, including the media stream, concurrently.

17. The method for performing media encryption of claim 10, wherein less than 7% of the output media stream is encrypted.

18. The method for performing media encryption of claim 10, further comprising:
- inserting, by the media encryption system, null packets that indicate whether subsequent packets are encrypted or unencrypted.

19. The method for performing media encryption of claim 10, wherein the media stream is encoded according to MPEG-2.

* * * * *